Figure 1:
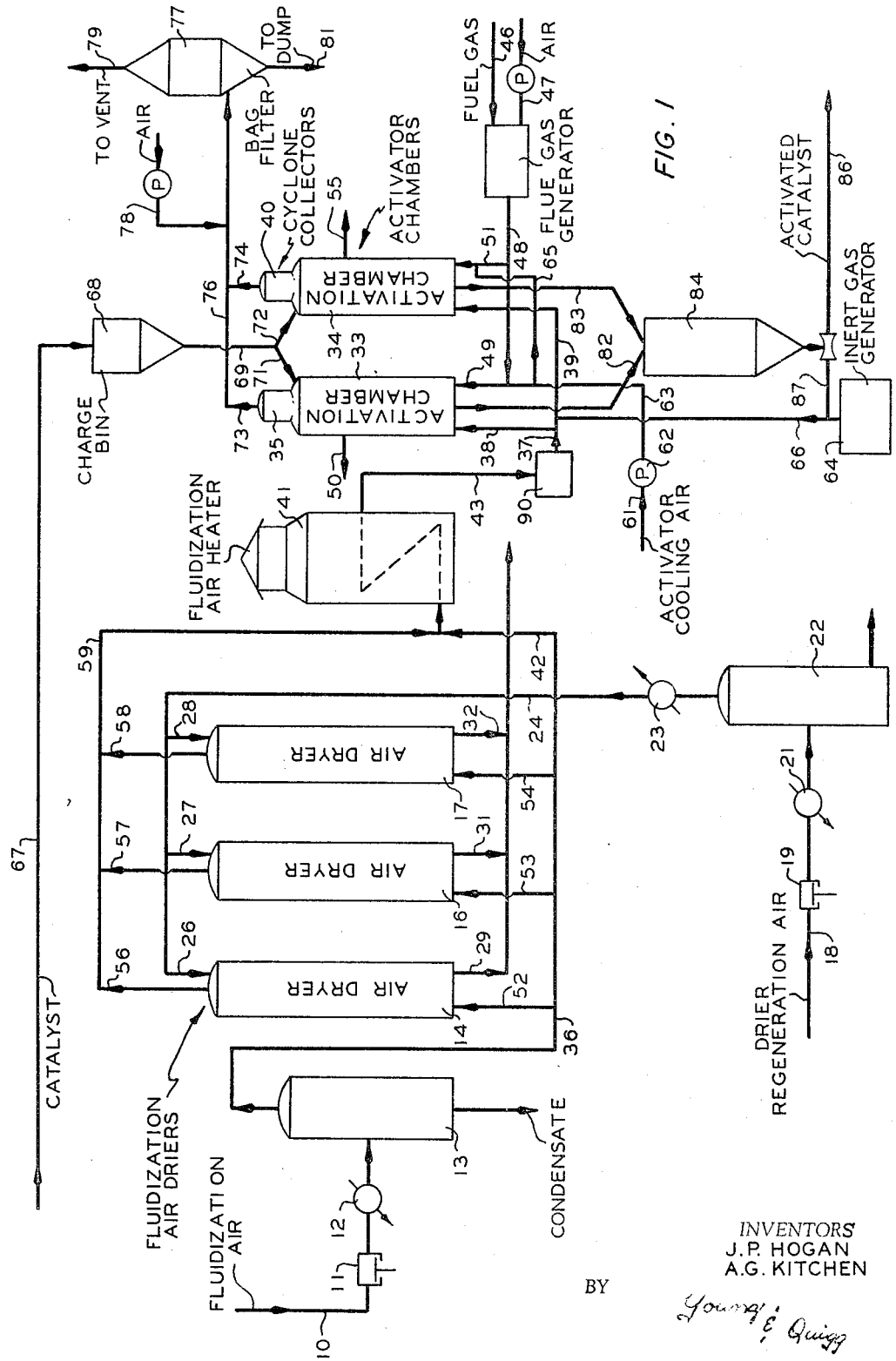

INVENTORS
J.P. HOGAN
A.G. KITCHEN
BY
Young & Quigg
ATTORNEYS

INVENTORS
J. P. HOGAN
A. G. KITCHEN
BY
Young & Quigg
ATTORNEYS

Patent 3,288,767

CONTROL OF SHEAR RESPONSE OF POLYOLEFINS

John Paul Hogan and Alonzo G. Kitchen, Bartlesville, Okla., assignors to Phillips Petroleum Company, a corporation of Delaware
Filed Aug. 20, 1962, Ser. No. 217,801
4 Claims. (Cl. 260—88.2)

This invention relates to a process and apparatus for the control of shear response of polyolefins. More particularly, the invention relates to a method and apparatus for the control of shear response of a polyethylene by varying the water vapor content of the catalyst activation air.

One of the more critical properties in 1-olefin polymers is the shear sensitivity of the polymer. By "shear sensitivity" there is meant the sensitivity of shear rate to changes in shear stress applied to the molten polymer. This property also is referred to as "shear response"— the response of shear rate to changes in shear stress.

Although it is possible to vary at will the melt index of polyolefins it is not always a simple matter to control the shear response. Many of the factors which influence this property are still unknown, and consequently it can vary significantly through chance factors. Frequently the best that can be done is to mark one lot of polymer for one application and another polymer lot for another application.

Shear response of a polymer is largely a function of molecular weight distribution—the narrower the distribution, the less change in shear rate with change in applied shear stress. Conversely, the wider the molecular weight distribution, the greater is the shear response which is, in turn, reflected in the processability of that polymer for certain types of applications. Fabrication of polyethylene bottles is an example of an application where high shear response polymer is particularly advantageous. On the other hand, low shear response polyethylene is desirable in applications involving injection molding of items which might otherwise have a tendency to warp and also in vacuum forming operations where it minimizes sagging of the polymer during processing of same. Some fiber and paper coating applications also find low shear response polymers advantageous.

The extent of a molecular weight distribution of a polymer is generally expressed by the ratio of the weight average molecular weight to the number average molecular weight ($M_w/M_n$). However, it has been found that the molecular weight distribution as expressed by $M_wM_n$ is also proportional to the ratio of high load melt index to regular melt index (HLMI/MI). The determination of polymer melt index (ASTM D1238) is convenient, and therefore it is similarly convenient to measure the molecular weight distribution by means of the melt index ratio and to use this value in predicting the polymer's shear response.

It is generally common practice to activate a particulate metal oxide containing catalyst while it is in a fluidized state brought about by a stream of flowing air in a cylindrical chamber. The heat may be applied by heating of the fluidizing air or by the use of heating elements on or within the activation chamber or by a combination of these two techniques. The activation temperature is defined as the maximum temperature to which the solid catalyst is exposed. In the normal operation, the fluidized mass is heated to the activation temperature and is then held at this temperature for prescribed activation periods. It is then cooled while still in the fluidized state and in the presence of dry air or inert gas.

We have now found that the amount of moisture in the warm-up, hold or cool-down phases of this operation will influence the character of the catalyst. However, the catalyst is more receptive to such moisture variations while it is in the hold stage, that is, at maximum temperature. For best control, therefore, we prefer to confine the moisture variation to the hold stage while conducting both the warm-up and cool-down stages in an essentially anhydrous manner (dewpoint below about −60° F.).

Thus it is an object of this invention to provide a method of and apparatus for adequately controlling the shear response of 1-olefin polymers.

Another object of this invention is to provide a method of and apparatus for controlling the shear response of linear high-density polyethylene.

A further object of this invention is to provide a means for controlling the moisture content in the polymer catalyst activation zone so as to render same suitable for controlling the shear response of the formed polymer.

Figure 2:
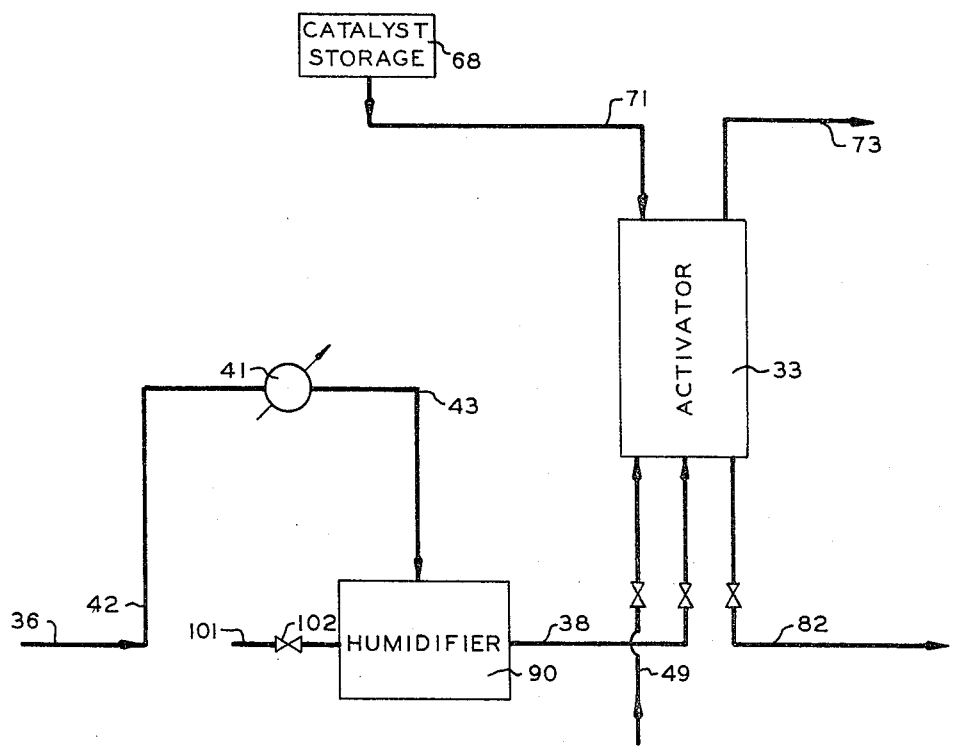
Figure 3:
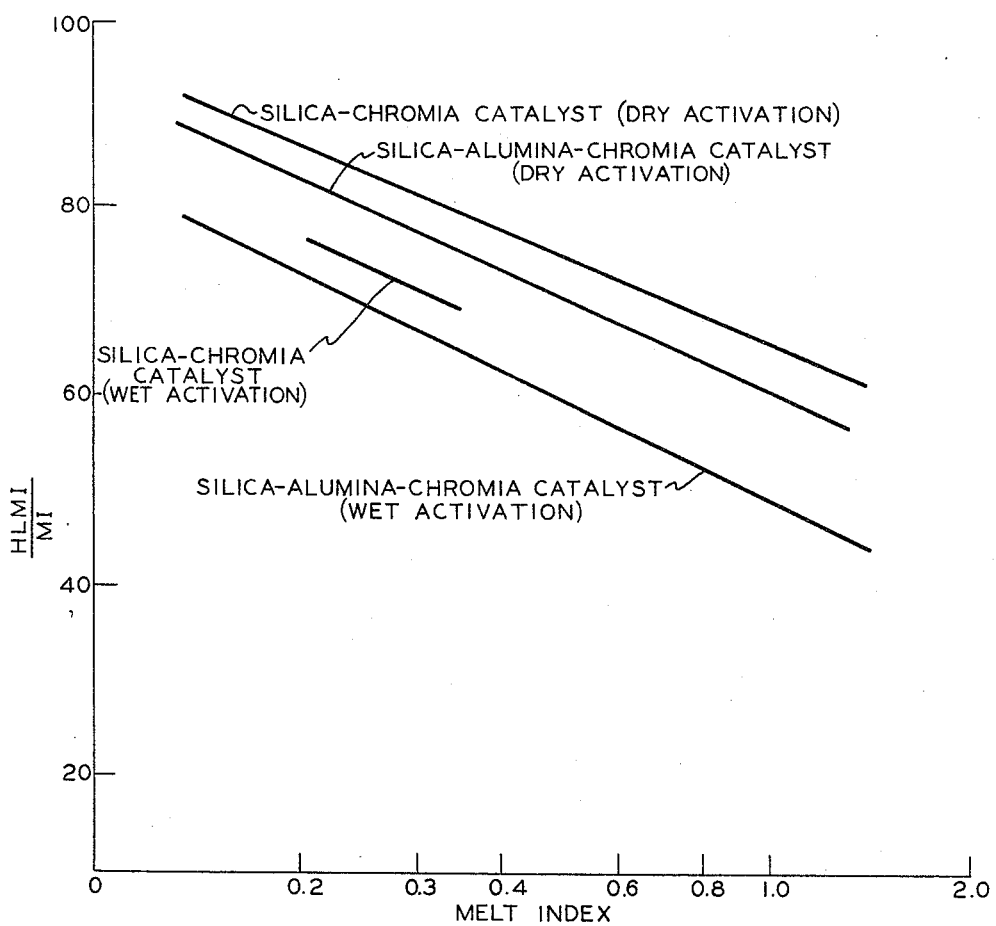

Other aspects, objects, and the several advantages of this invention will become apparent from a consideration of the specification, the appended claims, and the accompanying drawings, of which FIGURE 1 is a schematic representation of the apparatus utilized in our invention, FIGURE 2 is a schematic representation of the moisture control system of FIGURE 1, and FIGURE 3 is a graphical representation of the results obtained by the present invention.

The catalysts to which this invention is applicable are those chromium oxide containing catalysts whose preparation is described by U.S. Patent 2,825,721. It is particularly applicable to catalysts comprising microspheroidal silica or silica alumina over which there has been distributed about 1 to 5 weight percent of an oxide of chromium at least part of which is in a hexavalent form.

The polymerization process to which this invention is applicable also are those described in U.S. Patent 2,825,-721. However, it is particularly applicable in the preparation of polyethylene and copolymers in which combined ethylene is present in amounts greater than about 75 mol percent. Such copolymers can be prepared from mixtures of ethylene and one or more other olefins, such as propylene, 1-butene, 1-pentene, 1-hexene, 4-methyl-1-pentene, and the like as well as such diolefins as butadiene and isoprene.

The flow rate of the activation air through the particulate catalyst is dependent largely upon the particle size of the catalyst and will generally range from 0.15 to about 1.5 feet per second. Flow rates within this range generally will produce the desired degree of fluidization but will not appreciably affect the shear response-controlling aspects of the present invention. In this respect, the moisture content of the air appears to be the only controlling factor.

The activation time of the catalyst, that is the duration of time the catalyst is exposed to the maximum temperature and to the activation air with controlled moisture content, may vary over a wide range depending upon the activation temperature, the type of catalyst used, and the polymer desired. The activation time will vary from 0.1 hour to about 50 hours but more usually from about 3 to about 10 hours. The activation temperature will vary from about 750° F. to about 1500° F. and more usually from about 900° F. to 1100° F. In the case of the more durable catalyst supports, such as certain forms of silica, the activation temperature may be as high as 2000° F.

As shown in the accompanying FIGURE 1, fluidization air is supplied through conduit 10, this air being compressed in compressor 11, cooled in cooler 12 and condensate removed therefrom in vessel 13. In order to dry the air a series of fluidization air driers illustrated schematically as 14, 16 and 17 are employed. Suitable drying agents include calcium sulfate, calcium chloride, and silica alumina. Using a series of driers such as illustrated provides a method of supplying a continuous stream of dried air since one chamber can be on standby, one can be under regeneration, while the third is in use. Regeneration air is supplied by means of conduit 18, this air being compressed in compressor 19, cooled in cooler 21, condensate removed therefrom in vessel 22 and heated in heater 23. This regeneration air is supplied by means of conduit 24 containing branches 26, 27 and 28 to driers 14, 16 and 17, respectively. This regeneration air is vented by means of conduits 29, 31, and 32. The driers should have a dew point preferably below −60° F. at 40 p.s.i.a. The fluidization air is passed from vessel 13 to the activator chambers 33 and 34 (provided with cyclone collectors 35 and 40, respectively). The first stage of this activation treatment comprises heating the catalyst to a temperature of 750° F. This air can be supplied through conduits 38 or 39, depending upon which activator chamber is on stream. The heating for the fluidization air is supplied by fluidization heater 41, the air passing to this heater through conduit 59. Extending from heater 41 is conduit 43, this conduit communicating with conduit 37 through controller 90. The temperature can be controlled by passing all the gas through heater 41 or, and more preferably, the air heater 41 can be operated at a uniform temperature and an increasing amount of the air supply to activator chamber can be passed therethrough. The flow rate of the fluidization air depends, of course, upon the particle size of the catalyst, but a suitable range is from 0.15 to 1.5 feet per second. Additional heat is supplied to the activator chamber, this being supplied by flue gas generator 44 provided with fuel supply conduit 46 and air supply conduit 47. The flue gas passing therefrom is introduced into the activator chamber by means of conduits 48 and 49 or 51. Conduits 50 and 55 are provided for removal of flue gas from chambers 33 and 34, respectively. The heat supplied by this flue gas constitutes the major portion of the heat for the catalyst treatment.

Following this heating to 750° F., a further period is used to raise the temperature to within the range of 750° to 2000° F., preferably 900° to 1100° F., in the presence of moist air. For this purpose, the air is passed through conduit 36 to conduit 42 which communicates with air heater 41. The temperature is increased to within the range of from 750° F. to 2000° F., the preferred activation temperature range. The temperature is maintained preferably at approximately 900° to 1100° F., utilizing the air as the fluidization gas. During the time the temperature for activating the catalyst is at the maximum, moisture controller 90 is utilized to regulate the moisture content of the heated air being used for activation purposes and is so adapted as to provide a content of from 0.01 to 6.0 volume percent. By varying the concentration of water vapor in the chromium oxide catalyst activation air during the miximum temperature heating stage, there is achieved an influence on the shear response which increases with decreasing water vapor content. Should the source of air have a moisture content greater than that required, then the air should first be dried and remoistened by controller 90.

At the end of this stage of the treatment the catalyst is cooled in the stepwise manner. Dry air is passed over the catalyst, thus reducing the temperature to approximately 750° F. As with the heating, the major portion of the heat exchange for cooling is indirect, activator cooling air being supplied by conduit 61 which extends to pump 62. Extending from pump 62 are conduits 63 and 65 which communicate with conduits 49 and 51, respectively. In this step the temperature of the fluidization air is gradually decreased. The last stage of cooling is done in the presence of inert gas or dry air, and the catalyst is cooled from 750° F. to 100° F. Gas generator 64 is provided having conduit 66 extending therefrom and communicating with conduit 37 to supply inert gas to chambers 33 and 34. An inert gas such as one having less than 5 parts per million of carbon monoxide and oxygen and less than 0.2 percent by volume of hydrogen is satisfactory. The dewpoint is preferably reduced to −6° F. at 40 p.s.i.a. Finally, the catalyst supplied to conduit 67 is introduced into charge bin 68 and then by means of conduits 69, 71 and 72 to chambers 33 and 34. Conduits 73 and 74 are provided extending from the top of the activator chambers, these conduits communicating with conduit 76 which extends to filter 77, conduit 76 being provided with auxiliary air conduit 78. This auxiliary air is provided to cool the exhaust gases passing to the filter. From filter 77 conduit 79 extends to a vent and conduit 81 extends to a dump. Following activation the catalyst is passed from the bottom of the activator chamber 33 or 34 by means of conduit 82 or 83 to collection chamber 84. As needed, activated catalyst is removed from collector 84 and passed to the point of use, a pneumatic gas transfer line being shown as conduit 86, this being supplied with inert gas by means of conduit 87 which in turn is connected to conduit 66.

As shown in FIGURE 2, moisture controller 90 is provided with a source of water through conduit 101. The amount of water to be introduced into the air stream 43 is regulated by valve 102. During the activation stage when moisture is being added to the heated air introduced to activator 33, the air is conducted by way of conduits 36 and 42 to heater 41, thus avoiding the series of driers required in raising the temperature to the activation range. As the heated air passes through humidifier or moisture controller 90, the moisture content is raised to the level to give the desired shear response. The moist air is then introduced into activator 33 by way of conduit 38. Catalyst is introduced from storage bin 68 by way of conduit 71. Spent air is exhausted by way of conduit 73. After completion of the activation and cooling down of the activator 33, the catalyst is removed as previously described through conduit 82. If desired, a by-pass conduit can be provided around humidifier 90 which can then be used when dry air is being introduced to activator 33.

If a catalyst which produces a maximum shear response polymer is desired, the fluidizing air having a moisture level of about 0.01 is used. If a low shear response polymer is desired, moisture content of the air is adjusted to about 6 volume percent. By adjusting the moisture to a level between about 0.01 and 6.0 volume percent, intermediate results are thereby obtained.

As stated previously, the shear response properties of the catalyst are most influenced by the activating air moisture during the maximum temperature hold stage of the operation. After the catalyst has been treated with the moisture controlled air to the extent desired, it is desirable to follow this treatment with a dry air treatment comprising a continuation of the heating period but with a return to the essentially anhydrous fluidizing air. This is particularly desirable when relatively high moisture-containing air is used for the production of low shear responsive polymers. This additional dry air treatment will remove residual moisture and improve the overall activity of the catalyst without interfering with the intended effects of the preceding wet air treatment. The duration of this additional dry air activation treatment may vary within the same range given for the controlled moisture treatment.

After the activation treatment the catalyst is cooled with dry fluidizing air. Alternatively, a similarly dried inert gas such as nitrogen may be used in this cool-down stage. The activated catalyst is then stored in the presence of an inert gas until used.

The following example is presented to further illustrate the present invention.

EXAMPLE

In order to clearly illustrate the invention and demonstrate the product control it offers, a family of copolymers was produced in the presence of catalysts activated with air at each of two humidity levels; namely, at about 0.01 volume percent moisture content and at about 6.0 volume percent moisture content. The family consisted of a series of copolymers with varying melt index values. The variations were obtained by adjusting the reaction temperature or the feed monomers, two methods well known in the art. Within the range utilized, these temperature and feed variations had no effect upon the principal property studied, namely the high load melt index:regular melt index ratio. The invention is also illustrated with two different catalysts, namely a microspheroidal silica containing 2.5 weight percent chromium and a microspheroidal silica-alumina (87:13) which also contained 2.5 weight percent chromium. A number of runs were carried out in this manner, and the essential data are tabulated in Table I.

Some of the data also are plotted in FIGURE 3. From this figure it is clearly seen that the control of the quantity of moisture in the air used for activating the catalyst can be used to vary the shear response (as indicated by values for the HLMI/MI ratio) of the polymer over a significant range.

*Table I*

EFFECTS OF ACTIVATION AIR VARIATION ON HLMI/MI (SHEAR RESPONSE) OF ETHYLENE-BUTENE-1 COPOLYMERS

Catalyst: Microspheroidal silica or microspheroidal 87:13 silica-alumina containing 2.5 wt. percent Cr activated in a Pyrex tube at 1,000° F.
Polymerization: 1 hr. reaction at 450 p.s.i.g. in a 1.3 liter agitated reactor using 0.02-0.08 g. catalyst and 342 g. cyclohexane per run.

| Run No. | Weight Percent Butene-1 in Feed | Average Reaction Temperature, °F. | Polymer Yield, g./g. | Polymer Density, g./cc. | Melt [1] Index | HLMI/MI [2] |
|---|---|---|---|---|---|---|
| Section A—Silica Catalyst Activated 5 hr. in Air Containing 0.01 Vol. Percent Water Vapor | | | | | | |
| 1 | 5.7 | 278 | 1,240 | 0.950 | 0.257 | 84 |
| 2 | 5.9 | 279 | 1,360 | 0.951 | 0.306 | 82 |
| 3 | 6.2 | 282 | 1,306 | 0.951 | 0.281 | 82 |
| 4 | 5.6 | 284 | 946 | 0.953 | 0.300 | 85 |
| 5 | 6.4 | 284 | 1,075 | 0.950 | 0.464 | 76 |
| 6 | 6.7 | 289 | 1,130 | 0.950 | 0.695 | 73 |
| Section B—Silica Catalyst Activated 5 hr. in Air Containing 6 Vol. Percent Water Vapor Followed by 16 hr. in Dry Air | | | | | | |
| 7 | 4.6 | 271 | 2,080 | 0.949 | 0.262 | 73 |
| 8 | 4.7 | 274 | 1,795 | 0.950 | 0.260 | 75 |
| Section C—Silica-Alumina Catalyst Activated 5 hr. in Air Containing 0.01 Vol. Percent Water Vapor | | | | | | |
| 9 | 4.5 | 251 | 1,760 | 0.952 | 0.307 | 79 |
| 10 | 5.2 | 253 | 2,360 | 0.953 | 0.406 | 73 |
| 11 | 5.2 | 259 | 1,530 | 0.952 | 0.476 | 73 |
| 12 | 5.5 | 262 | 2,088 | 0.951 | 0.678 | 64 |
| Section D—Silica-Alumina Catalyst Activated 5 hr. in Air Containing 6 Vol. Percent Water Vapor Followed by 16 hr. in Dry Air | | | | | | |
| 13 | 4.6 | 245 | 1,412 | 0.948 | 0.243 | 70 |
| 14 | 5.1 | 246 | 1,864 | 0.950 | 0.324 | 63 |
| 15 | 5.3 | 249 | 1,445 | 0.949 | 0.410 | 65 |
| 16 | 6.2 | 249 | 1,750 | 0.949 | 0.422 | 63 |
| 17 | 5.2 | 253 | 1,649 | | 0.491 | 59 |

[1] ASTM D 1238 Condition E.
[2] ASTM D 1238 Ratio of Condition F melt index value to Condition E value.

From the above it is clearly seen that control of the quantity of moisture in the air used for activating the catalyst can be used to vary the shear response (as indicated by the values for the HLMI/MI ratio) of the polymer over a significant range.

As will be evident to those skilled in the art, various modifications of this invention can be made, or followed, in the light of the foregoing disclosure and discussion without departing from the spirit or scope thereof.

We claim:
1. A process for obtaining a polymer having a constant shear response which comprises forming a polymer of a 1-olefin by polymerizing at least one 1-olefin monomer in a polymerization zone under polymerization conditions in the presence of a previously activated catalyst consisting of chromium oxide having at least a portion thereof in the hexavalent state at the time of initial contacting, said activated catalyst having been prepared by treating same with an activating fluid containing from 0.01 to 6.0 vol. percent moisture therein at a temperature of 750 to 2000° F., and thereafter continually added to said polymerization zone, measuring the shear response of said polymer to obtain a value representative thereof and adjusting responsive to said value the moisture content of said activating fluid whereby the moisture content is increased responsive to a decrease in the measured shear response and conversely the moisture content is decreased responsive to increase in the measured shear response.

2. The process of claim 1 wherein said polymer is an ethylene homopolymer.

3. The process of claim 1 wherein said polymer is an ethylene-1-butene copolymer.

4. The process of claim 1 wherein the activation temperature is between 750° F. to about 1500° F.

References Cited by the Examiner
UNITED STATES PATENTS

| | | | |
|---|---|---|---|
| 2,825,721 | 3/1958 | Hogan et al. | 260—94.9 |
| 2,984,658 | 5/1961 | Seydel et al. | 260—94.9 |

OTHER REFERENCES

Perry. Chemical Engineers' Handbook, 3rd ed., TP 155 P4, McGraw Hill, 1950, page 763 relied on.

JOSEPH L. SCHOFER, *Primary Examiner.*

F. L. DENSON, *Assistant Examiner.*